United States Patent
Friend et al.

[11] Patent Number: 6,116,613
[45] Date of Patent: Sep. 12, 2000

[54] SHAFT WIPER SEAL

[75] Inventors: Anthony D. Friend; Mark J. Kiesel, both of Peoria, Ill.

[73] Assignee: Caterpillar Inc., Peoria, Ill.

[21] Appl. No.: 09/038,509

[22] Filed: Mar. 11, 1998

[51] Int. Cl.$^7$ ........................................... F16J 15/32
[52] U.S. Cl. ........................................ 277/549; 277/560
[58] Field of Search ................................ 277/549, 560, 277/572, 575

[56] References Cited

U.S. PATENT DOCUMENTS

| | | |
|---|---|---|
| 3,720,418 | 3/1973 | Berg . |
| 3,830,508 | 8/1974 | Endicott .............................. 277/560 X |
| 4,210,339 | 7/1980 | Povejsil . |
| 4,258,927 | 3/1981 | Cather, Jr. ........................... 277/560 X |
| 4,359,228 | 11/1982 | Cather . |
| 4,618,153 | 10/1986 | Nilsson . |
| 4,709,932 | 12/1987 | Edlund et al. ...................... 277/560 X |
| 4,984,812 | 1/1991 | Wada et al. ............................ 277/560 |
| 5,137,285 | 8/1992 | Pick . |
| 5,213,343 | 5/1993 | White, Jr. ............................... 277/572 |
| 5,263,404 | 11/1993 | Gaucher et al. . |
| 5,288,086 | 2/1994 | Kiesel . |
| 5,503,408 | 4/1996 | Hemann et al. ..................... 277/575 X |
| 5,957,461 | 9/1999 | Ulrich ................................. 277/549 X |

FOREIGN PATENT DOCUMENTS 2083873  3/1982  United Kingdom .

OTHER PUBLICATIONS

R.H. Warring, "Seals and Sealing Handbook", 1$^{st}$ Edition Gulf Publishing Co. Houston, TX, pp. 225–234, 1981.

*Primary Examiner*—Anthony Knight
*Assistant Examiner*—Karlena D. Schwing
*Attorney, Agent, or Firm*—J. W. Burrows; Jenkens & Gilchrist

[57] ABSTRACT

A wiper seal is disclosed which includes an elastomeric member having a metal support member adhesively bonded thereto. The elastomeric member has a first substantially flat surface that is perpendicular to a reference axis of the wiper seal, an outer peripheral surface that is substantially parallel with the reference axis, and an inner peripheral surface that forms an acute angle with the reference axis. The metal support member has a first leg portion that coincides with the outer peripheral surface and a second leg portion that coincides with the substantially flat perpendicular surface. The intersection of the first and second leg portions forms a generally sharp corner or at least a predetermined minimum radius size. When the wiper seal is installed in a recess of a housing, the substantially flat perpendicular surface is generally flush with the surface of the housing adjacent the recess to substantially eliminate recesses or pockets that could retain dirt and/or other contaminants.

7 Claims, 3 Drawing Sheets

6,116,613

SHAFT WIPER SEAL

TECHNICAL FIELD

This invention relates generally to rod/shaft wipers, and more particularly, to wiper seals for rods of hydraulic cylinders or the like.

BACKGROUND ART

Currently known rod wiper constructions for hydraulic cylinders and the like typically utilize an elastomeric or metallic ring having at least one circumferential lip positioned for scraping or wiping a rod or shaft that is movable axially through an aperture defined by the ring. One problem encountered when using currently known rod wiper constructions is debris accumulation around the lip or other adjacent cavities that can ingress into the hydraulic cylinder as the shaft is retracted therein. Another problem is that the lip of some designs extends axially outward from the seal housing and many times contact rough surfaces that damage the lip of the wiper. Once the lip of the wiper is damaged, dirt or other contaminants can ingress into the internal cavity of the cylinder.

Installation of known seals has also proven to be a problem. In the past, metal support members have been secured to the wiper member in order to provide a more rigid member that aids in the installation process and also permits an interference fit between the wiper seal and the housing or member that the wiper seal is being inserted into. Even though wiper seal installations tools are made available, it is common practice for installers to use a hammer to install the wiper seals without the use of the proper installation tool. The hits by the hammer on the known wiper seals many times results in damage to the metal support member and subsequent damage to the wiper member.

The subject invention is directed to overcoming one or more of the problems as set forth above.

DISCLOSURE OF THE INVENTION

In one aspect of the present invention, a wiper seal is provided and defines a reference axis. The wiper seal is adapted to be secured in a housing and operative to clean the surface of an axially movable shaft. The wiper seal includes an elastomeric member and a metal support member. The elastomeric member has a first substantially flat surface that is perpendicular to the reference axis, a second opposed surface, an outer peripheral surface that is substantially parallel with the reference axis and an inner peripheral surface that forms an acute angle with the reference axis. A wiper portion is defined by the intersection of the first substantially flat surface and the inner peripheral surface. A generally sharp corner is formed by the intersection of the first substantially flat surface and the outer peripheral surface. The metal support member has a first leg portion extending along and secured to the outer peripheral surface and a second leg portion extending along and secured to a portion of the first substantially flat surface. The first and second leg portions have respective inner surfaces and the intersection of the respective inner surfaces coincide with the intersection of the outer peripheral surface and the first substantially flat surface of the elastomeric member.

BEST MODE FOR CARRYING OUT THE INVENTION

Figure 1:
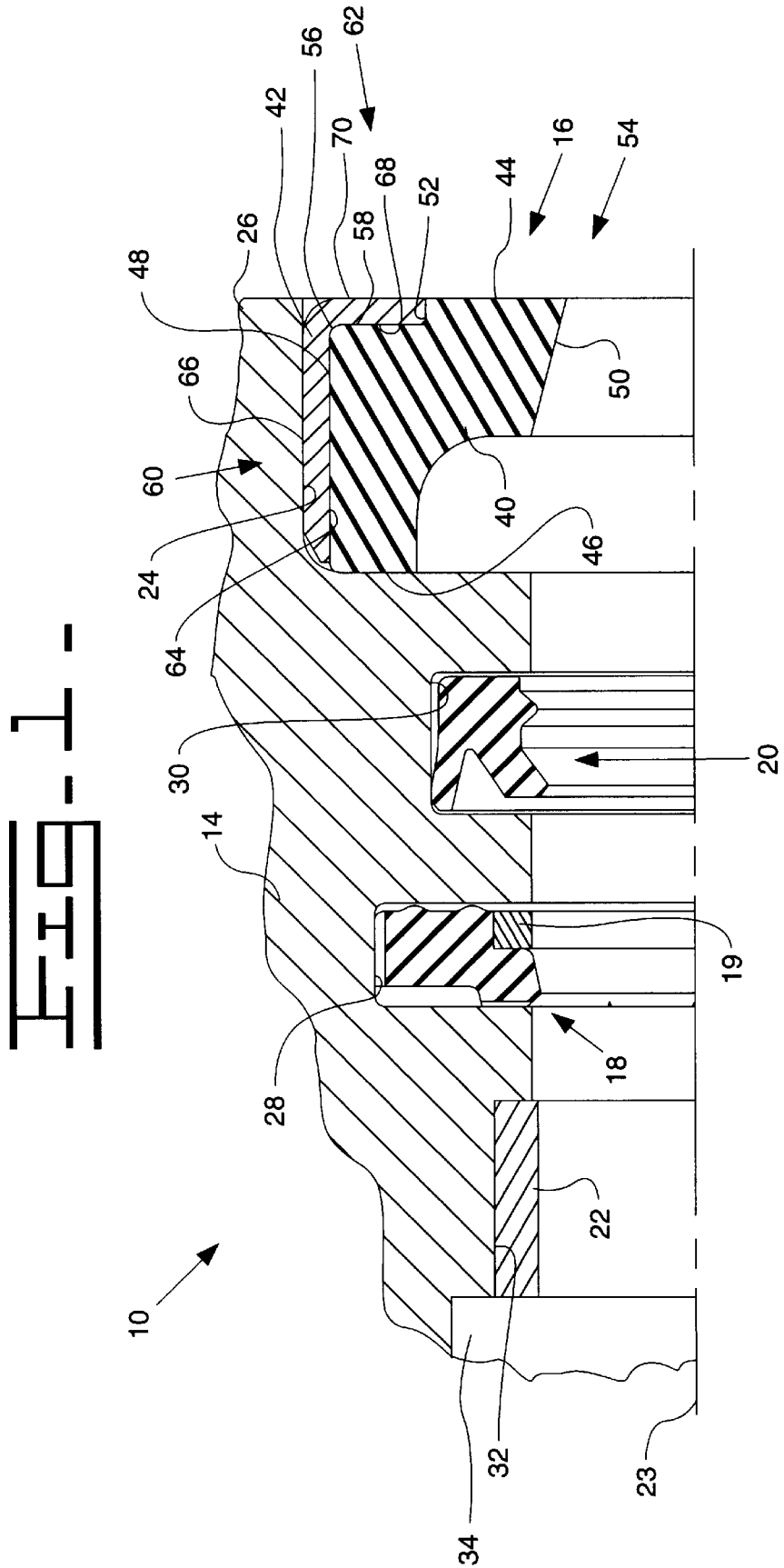
FIG. 1 is a diagrammatic representation of a portion of a ho sing having a shaft sealing arrangement disposed therein that includes an embodiment of the subject invention.
Figure 2:
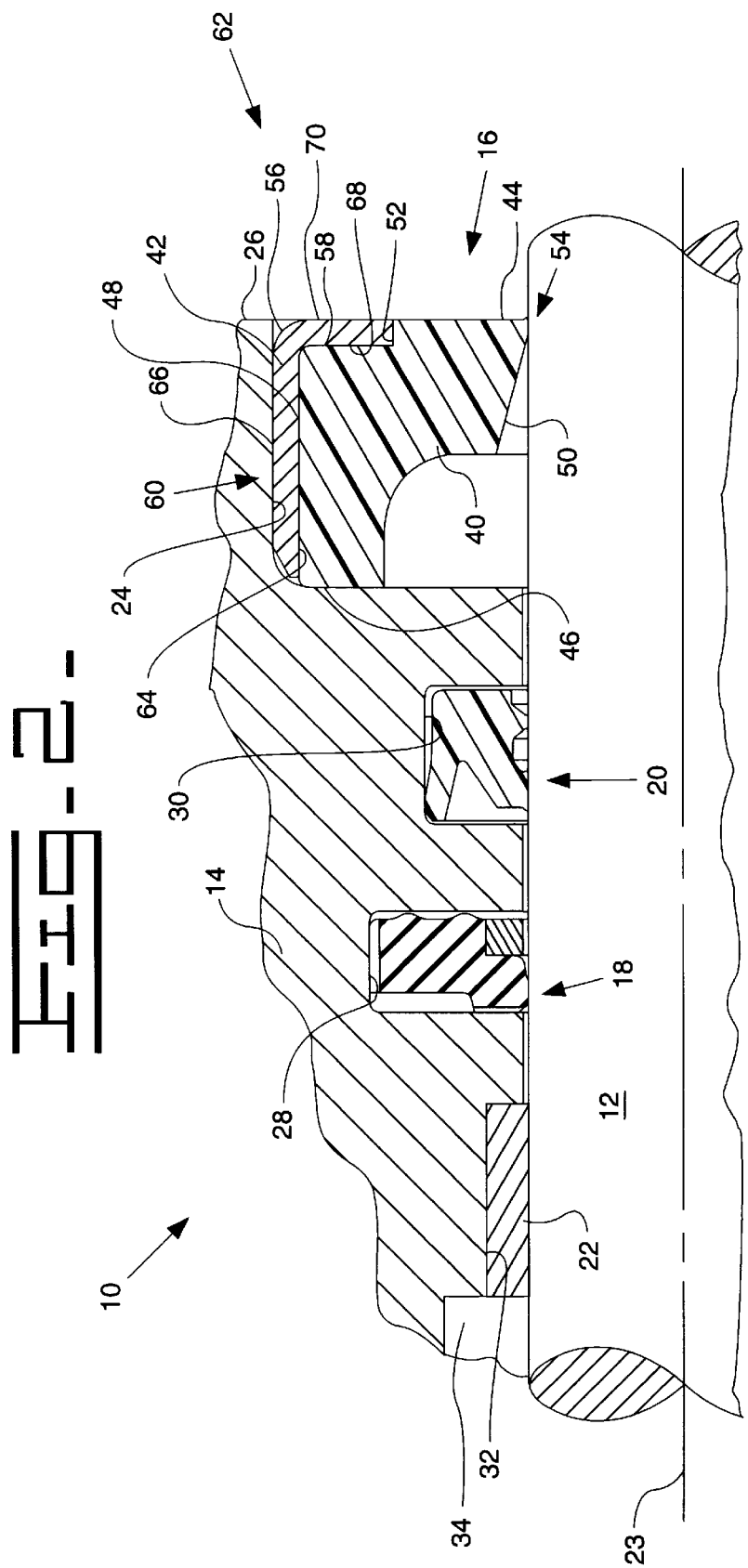
FIG. 2 is a diagrammatic representation of the housing and sealing arrangement of FIG. 1 with an axially movable shaft disposed therein through the sealing arrangement.
Figure 3:
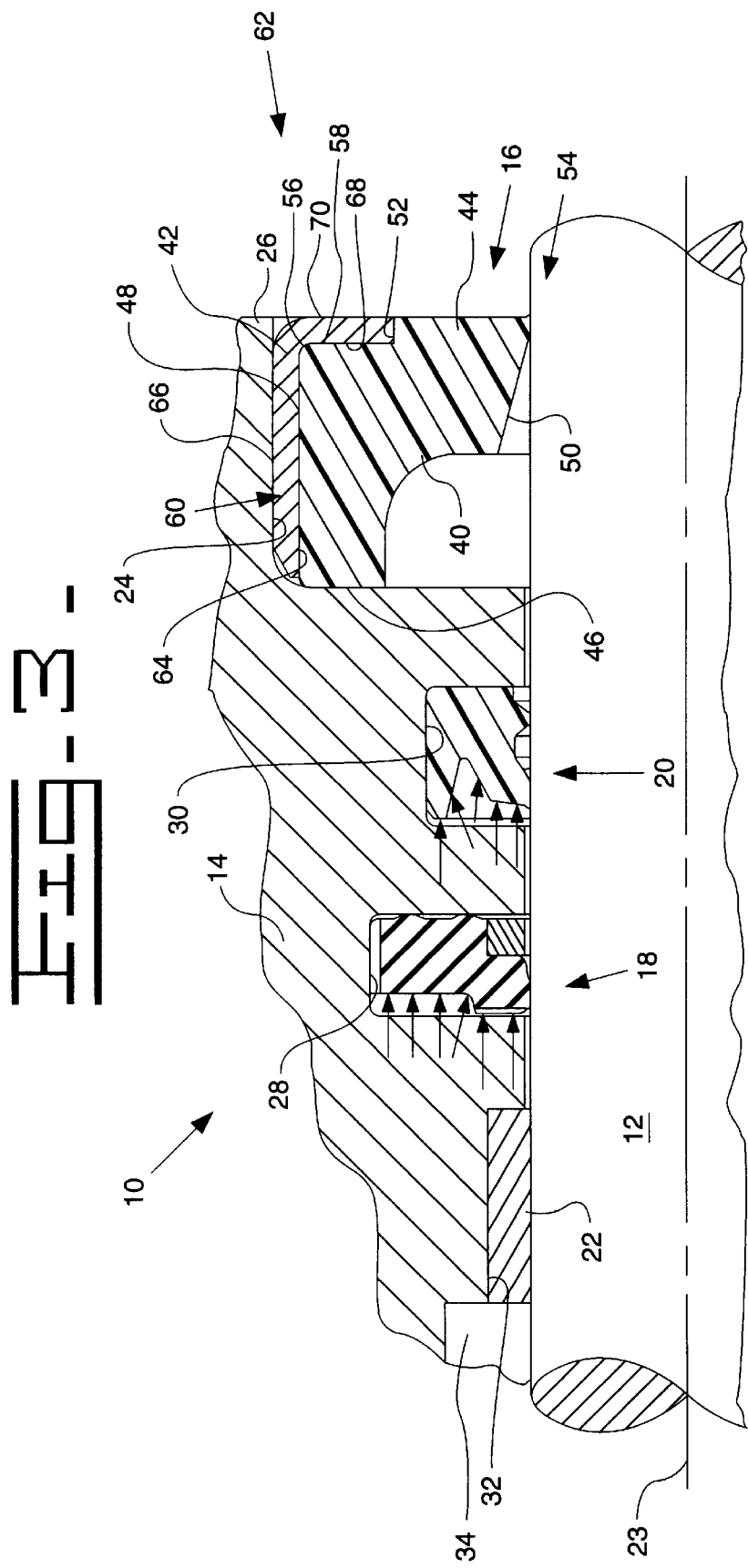
FIG. 3 is a diagrammatic representation of FIG. 2 with arrows' attached to illustrate the presence of pressurized fluid acting on the buffer seal and the lip seal of the sealing arrangement.

Referring to the drawings and more particularly to FIGS. 1–3, a sealing arrangement 10 is illustrated to provide sealing of pressurized fluid between an axially movable shaft 12 and a housing 14. The sealing arrangement includes a wiper seal 16, a buffer seal 18 having a backup ring 19, a radial lip seal 20, and a wear strip 22. The center line of the shaft 12 serves as a reference axis 23 for each of the seals 16,18,20.

The housing 14 has a recess 24 defined in one end thereof extending inward from a generally flat end surface 26. A first groove 28 is defined in the housing and of a size to receive the buffer seal 18 and a second groove 30 is defined therein and of a size to receive the radial lip seal 20. A bore 32 is defined in the housing and receives the wear strip 22.

The wiper seal 16 is operative to clean dirt and other contaminants from the shaft 12 as it moves to the left as viewed in FIG. 2. This eliminates the possibility of the radial lip seal 20 or the buffer seal 18 being damaged by exposure to the contaminants.

The radial lip seal 20 is operative in a well known manner to prohibit the leakage of fluid from a fluid chamber 34 that contains high pressure fluid.

The buffer seal 18 is operative to absorb and seal high pressures within the fluid chamber 34. The arrows in FIG. 3 graphically illustrate pressure acting on the respective buffer and radial lip seals 18,20. It is recognized that the buffer seal 18 is normally subjected to sudden, larger pressure levels than the radial lip seal 20, even though the radial lip seal 20 must also withstand high levels of pressure.

The wiper seal 16 includes an elastomeric member 40 and a metal support member 42. The elastomeric member 40 has a first substantially flat surface 44 that is generally perpendicular with the reference axis 23, a second opposed surface 46, an outer peripheral surface 48 that is generally parallel with the reference axis 23, and an inner peripheral surface 50.

The first substantially flat surface 44 has a stepped portion 52 that is adjacent with the outer peripheral surface 48. When the wiper seal is installed, the first substantially flat surface 44 is flush with the flat surface 26 of the housing 14.

The inner peripheral surface 50 forms an acute angle with respect to the reference axis 23 and preferably less than about thirty degrees but not less than about five degrees. In most applications, the angle is preferably between ten and twenty degrees. A wiper portion 54 is formed by the intersection of the first substantially flat surface 44 and the inner peripheral surface 50.

A generally sharp corner 56 is formed on the elastomeric member 40 by the intersection of the outer peripheral surface 48 and a surface 58 of the stepped portion 52.

The metal support member 42 has a first leg portion 60 and a second leg portion 62. The first leg portion 60 has respective inner and outer surfaces 64,66 and the second leg portion has respective inner and outer surfaces 68,70. The first leg portion 60 extends along the peripheral surface 48 and the second leg portion 62 extends along the surface 58 of the stepped portion 52. The intersection of the respective inner surfaces 64,68 coincides with the intersection of the outer peripheral surface 48 and the surface 58 of the stepped portion 52. The respective inner surfaces 64,68 of the first and second leg portion 60,62 of the metal support member 42 are adhesively bonded to the elastomeric member 40.

The outer surface 70 of the second leg portion 62 is generally flush with the first substantially flat surface 44 of the elastomeric member 40 and the flat surface 26 of the housing 14. The radius of the intersection of the respective outer surfaces 66 and 70 is held to a predetermined minimum size in order to minimize any collection of contaminants between the radius and the exposed surface of the recess 24 and to maintain the greatest amount of frictional contact between the surface of the recess 24 and the outer surface 66 of the metal support member 42. The area in the location around the wiper portion 54 is free of any pockets, cavities, or recesses. Consequently, contaminants cannot collect in these areas and ingress into the radial seal 20 or the buffer seal 18.

It is recognized that the wiper seal 16 could either be used by itself or in combination with other types of seals. The usage illustrated in the drawings are for example only and is not to be considered as limiting the use of the wiper seal 16.

INDUSTRIAL APPLICABILITY

During operation, the wiper portion 42 of the wiper seal 16 cleans the surface of the shaft 12 as it moves leftward, as viewed in the drawings. By having the first substantially flat surface 44 of the elastomeric member 40 and the outer surface 70 of the metal support member 42 generally flush with the flat surface of the housing 14, no contaminants can collect near the wiper portion 54. Additionally, if the subject wiper seal 16 is being used in a hydraulic cylinder or the like, the wiper portion 54 is not extended outwardly away from the housing 14 where it could be subjected to rough or coarse surfaces. These rough or coarse surfaces could be areas in which an eyelet is welded to the cylinder rod or areas of a shaft or rod that is pitted or has not been finished.

The acute angle of the inner peripheral surface 50 with respect to the reference axis 23 functions to help control the magnitude of force that is being applied between the wiper portion 54 and the shaft 12. By keeping the angle less than thirty degrees, the force can be controlled and the wiper portion 54 has sufficient backing to resist the tendency of the wiper portion 54 extruding inward during use.

The second leg portion 62 in cooperation with the small radius at the intersection of the second leg portion 62 with the first leg portion 60 is functional to provide a sturdy surface for the assembler to hammer against when installing the wiper seal 16 into the recess 24. Since most assemblers do not use special tools to install wiper seals, it is important to provide a wiper seal that has sufficient durability to resist the blows of a hammer during assembly.

What is claimed is:

1. A wiper seal defining a reference axis and being adapted to be secured in a housing and operative to clean the surface of an axially moveable shaft therethrough, the wiper seal comprising:

an elastomeric member having a first substantially flat surface that is perpendicular to the reference axis, a second surface, an outer peripheral surface that is substantially parallel with the reference axis and an inner peripheral surface that forms an acute angle with the reference axis, a wiper portion defined by the intersection of the first substantially flat surface and the inner peripheral surface at a radially innermost portion of the seal and adapted to provide an intimate area of contact with an axially movable shaft disposed therethrough, said intimate area of contact between the wiper portion and the shaft being free of any recesses, and the intersection of the first substantially flat surface and the outer peripheral surface forming a generally sharp corner; and a metal support member having a first leg portion extending along and secured to the outer peripheral surface and a second leg portion extending along and secured to a portion of the first substantially flat surface, the first and second leg portions having respective intersecting inner surfaces, the intersection of the respective inner surfaces coinciding with the intersection of the outer peripheral surface and the first substantially flat surface of the elastomeric member.

2. The wiper seal of claim 1 wherein the first substantially flat surface of the elastomeric member has a stepped portion and the second leg portion of the metal support member is disposed in the stepped portion.

3. The wiper seal of claim 2 wherein each of the first and second leg portions has an outer surface and the intersection of the first and second outer surfaces of the respective leg portions forms a radius of a predetermined minimum size.

4. The wiper seal of claim 1 wherein the acute angle formed between the inner peripheral surface and the reference axis is less that thirty degrees.

5. The wiper seal of claim 4 wherein the acute angle is preferably in a range between ten and twenty degrees.

6. A The wiper seal of claim 1 wherein the metal support is adhesively bonded to the elastomeric member.

7. An assembly of a wiper seal and a housing, said housing having a flat surface with a recess extending inwardly therefrom, and said wiper seal defining a reference axis and adapted to be received within the housing and operative to clean the surface of an axially moveable shaft therethrough, said wiper seal comprising:

an elastomeric member having a first substantially flat surface that is perpendicular to the reference axis and generally flush with the flat surface of the housing, a second surface, an outer peripheral surface that is substantially parallel with the reference axis and an inner peripheral surface that forms an acute angle with the reference axis, a wiper portion defined by the intersection of the first substantially flat surface and the inner peripheral surface at a radially innermost portion of the seal and adapted to provide an intimate area of contact with an axially movable shaft disposed therethrough, said intimate area of contact between the wiper portion and the shaft being free of any recesses, and the intersection of the first substantially flat surface and the outer peripheral surface forming a generally sharp corner; and a metal support member having a first leg portion extending along and secured to the outer peripheral surface and a second leg portion extending along and secured to a portion of the first substantially flat surface, the first and second leg portions having respective intersecting inner surfaces, the intersection of the respective inner surfaces coinciding with the intersection of the outer peripheral surface and the first substantially flat surface of the elastomeric member.

* * * * *